C. D. HICKS.

Refrigerators.

No. 6,073. Reissued Sept. 29, 1874.

WITNESSES:
P. C. Dieterich
H. C. Scott

INVENTOR.
Canada D. Hicks, per C. H. Watson & Co
ATTORNEYS.

THE GRAPHIC CO. PHOTO-LITH. 39 & 41 PARK PLACE, N.Y.

UNITED STATES PATENT OFFICE.

CANADA D. HICKS, OF BOWLING GREEN, OHIO.

IMPROVEMENT IN REFRIGERATORS.

Specification forming part of Letters Patent No. 143,625, dated October 14, 1873; reissue No. 6,073, dated September 29, 1874; application filed August 25, 1874.

*To all whom it may concern:*

Be it known that I, CANADA D. HICKS, of Bowling Green, in the county of Wood and State of Ohio, have invented certain new and useful Improvements in Refrigerators and Coolers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to refrigerators and coolers, having for its object to improve the construction of the same, making a combined beer-cooler and refrigerator, designed to be placed in saloons or any desirable place, for cooling ale, beer, cider, &c., for cooling bottled beer, &c., for keeping meats and other articles cool, and for supplying ice-water, all of which is simple in construction and convenient in use; and it consists in the outer box or case, the inner cooling-box, and the cooling-vessels, constructed and combined with each other, and provided with pipes and faucets, as hereinafter more fully described.

Figure 1:
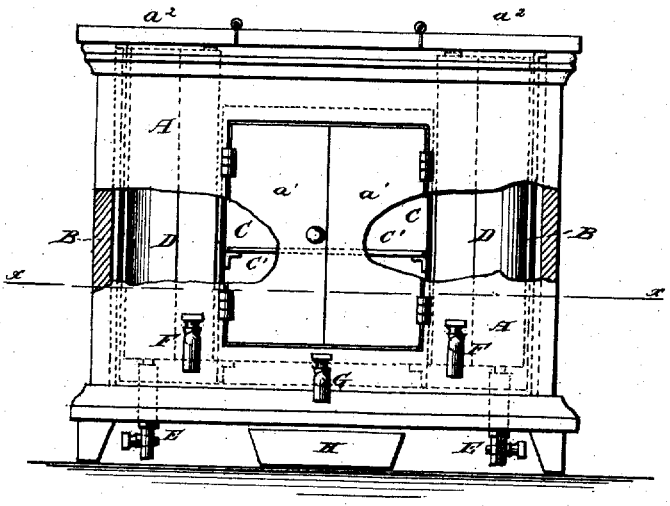
Figure 2:
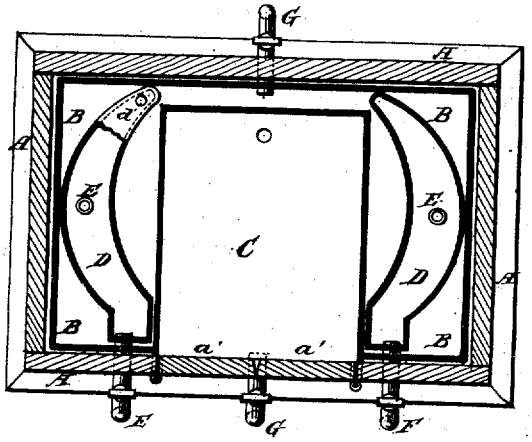

Referring to the accompanying drawings, Figure 1 is a front view of a cooler, parts being broken away to show the construction embodying my invention; and Fig. 2 is a horizontal section of the same, taken through line *x x* of Fig. 1.

A represents the wooden box or case of the cooler, which may be made, if desired, with double walls, packed with some suitable non-conducting material. The box A is provided with doors $a^1$ in front, and with a door, $a^2$, at each end of its top. The box A is lined with galvanized iron B, or some other suitable non-corrosive material. In the middle part of the box A B is placed a box, C, also made of galvanized iron, or some other non-corrosive metal, and which is so supported as to leave a space between it and the lining B upon its top, bottom, back, and sides, and the box C has a suitable ventilation at the top. The box C is designed to have shelves in it, as shown at C′, to receive bottles, meats, and other things to be cooled or preserved. In the spaces at the ends of the box A B are placed vessels D, to receive ale, beer, cider, or other liquids to be cooled. The vessels D are of such a shape and size as to leave spaces between them and the lining B and the box C for ice, which may fill the spaces and be held by suitable means. E are pipes leading into the vessels D through the bottom of the case A B, and which are designed to extend to the casks or other receptacles in which the beer or other liquid is kept, so that the said liquid may be forced into said vessels by force-pumps. The pipes E should be provided with stop-cocks, to prevent the liquid from flowing back through or standing in said pipes. The vessels D should be provided with openings *d′* in their tops, to allow the air to escape when filling them, and for convenience in cleaning them, which openings *d′* may be closed by plugs or other convenient stoppers. The liquid is drawn out of the vessels D through faucets F, leading into them through the front of the box A B. The ice-water is drawn out through faucets G, leading in through the box A B. The bottom of the box C may be provided with a perforation having a tube to admit air for ventilation. H is a pan, trough, or box, to be placed beneath the ice-water faucets G to receive the drip, and for convenience in washing tumblers, &c., and which should be provided with a pipe for carrying off the waste-water.

Having thus fully described my invention, what I claim, and desire to secure by Letters Patent, is—

1. The outer box or case A B, the inner cooling-box C, and the cooling-vessels D, constructed and combined with each other, and provided with pipes and faucets, substantially as herein shown and described.

2. The box C, with shelves C′ and ventilator, in combination with the case A B, vessels D, with spaces around them, pipes E, openings *d′*, and faucets, all as and for the purpose set forth.

In testimony whereof I hereunto set my hand in presence of two witnesses.

CANADA D. HICKS.

Witnesses:
P. S. ABBOTT,
MADISON YONKER.